Patented Jan. 11, 1938

2,105,342

UNITED STATES PATENT OFFICE 2,105,342

PROCESS OF REFINING MAGNESIUM

Adolf Beck, Bitterfeld, Germany, assignor, by mesne assignments, to Magnesium Development Corporation, a corporation of Delaware No Drawing. Application April 23, 1936, Serial No. 76,005. In Germany May 10, 1935

2 Claims. (Cl. 75—67)

This invention relates to a process of refining magnesium.

In the production of magnesium by the thermal decomposition of magnesiferous raw materials, with the aid of calciferous reducing agents such as calcium carbide, it has been observed that, in many instances, the metallic magnesium obtained is contaminated by larger or smaller amounts of metallic calcium. It has also been found that the same phenomenon is sometimes noticeable even when dolomite (which as is known, substantially consists of both magnesium and calcium-carbonate) is reduced by the aid of reducing agents, such as ferro-silicon or aluminium, which are free from calcium, although, in the latter case, complete reduction of the magnesia contained in the dolomite is supposed to occur before metallic calcium is formed.

The present invention aims at providing a process which will enable minor percentages of calcium such as occur in thermally produced magnesium to be eliminated from magnesium. By the term "magnesium" as used herein and in the appended claims is meant both magnesium in its various degrees of purity and magnesium base alloys.

To this end, according to the present invention, the metal to be refined is re-melted with highly fluid or mobile by which is meant unthickened saline melts containing magnesium chloride. In the course of this re-melting a certain quantity of the magnesium chloride is reduced by the calcium contained in the metal, with formation of calcium chloride, at temperatures below about 900° C., and, by thoroughly intermixing the metallic and saline melts, the whole of the calcium can be eliminated from the metallic regulus by conversion into calcium chloride which latter is absorbed by the residual saline melt. Obviously the quantity of magnesium chloride contained in the saline melt must be well in excess of the quantity required to convert the calcium present in the magnesium into calcium chloride according to the equation

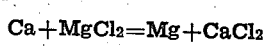

Ca+MgCl₂=Mg+CaCl₂

Since magnesium has the tendency to retain, in varying amounts and in a state of fine distribution, highly fluid saline mixtures (such as exist for example in pure anhydrous magnesium chloride or anhydrous carnallite), it is advisable, after the refining of the metal has been completed, to add to the reaction mixture substances, such as metal oxides and/or fluorides, and more particularly magnesium oxide or magnesium fluoride, which as is known, have an inspissating or thickening action on magnesium chloride or highly fluid or mobile saline mixtures containing magnesium chloride, in order to produce an agglomeration and thus also to promote a clean separation of the saline melt from the metallic regulus.

Example 100 kgs. of a crude magnesium produced by thermal reduction and containing about 0.2% of Ca, are melted down, together with 5 kgs. of practically anhydrous magnesium chloride, and then vigorously stirred for 5 minutes at a temperature of 720° C., such treatment resulting in the conversion of substantially all the calcium contained in the metal, into calcium chloride which is absorbed by the magnesium chloride present in excess. Towards the end of the treatment, 1 to 1.5 kgs. of magnesium oxide are gradually added to the melt whilst continuing stirring. Thereupon the stirring is discontinued and the surface of the melt is covered with a thin layer of a mixture of 80 parts of magnesium chloride and 20 parts of magnesium oxide. The melt is then heated to about 850° C., cooled down to the pouring temperature of 720° C. and cast into ingots. No calcium can be detected in the resulting product, which is also free from fluxing agents.

I claim:

1. A process of eliminating minor quantities of calcium from magnesium which comprises treating the said magnesium in the molten state with a molten unthickened flux containing magnesium chloride in a quantity substantially exceeding the quantity required to convert all the calcium present in the magnesium into calcium chloride, according to the equation

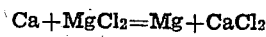

Ca+MgCl₂=Mg+CaCl₂ while vigorously stirring the mixture, and after the calcium content of the magnesium has been substantially converted into calcium chloride, incorporating an inspissating agent in the residual flux so as to promote separation of said flux from said magnesium.

2. A process of eliminating minor quantities of calcium from magnesium which comprises treating the said magnesium in the molten state with a molten unthickened flux containing magnesium chloride in a quantity substantially exceeding the quantity required to convert all the calcium present in the magnesium into calcium chloride, according to the equation

Ca+MgCl₂=Mg+CaCl₂ while vigorously stirring the mixture, and after the calcium content of the magnesium has been substantially converted into calcium chloride, incorporating an agent of the group consisting of the oxides and fluorides of calcium and magnesium, respectively, so as to promote separation of said flux from said magnesium.

ADOLF BECK.